March 27, 1962  L. G. BURNS  3,026,929
COMPOUND CENTRIFUGAL AND GEAR FUEL PUMP
Filed March 17, 1954  2 Sheets-Sheet 1

INVENTOR
LOUIS G. BURNS
BY *Ann Prentiss*
ATTORNEY

March 27, 1962  L. G. BURNS  3,026,929
COMPOUND CENTRIFUGAL AND GEAR FUEL PUMP
Filed March 17, 1954  2 Sheets-Sheet 2

INVENTOR
LOUIS G. BURNS
BY *Am Prentiss*
ATTORNEY

United States Patent Office 3,026,929
Patented Mar. 27, 1962

3,026,929
COMPOUND CENTRIFUGAL AND GEAR
FUEL PUMP
Louis G. Burns, West Hartford, Conn., assignor, by mesne assignments, to Chandler-Evans Corporation, West Hartford, Conn., a corporation of Delaware
Filed Mar. 17, 1954, Ser. No. 416,922
20 Claims. (Cl. 158—36.4)

This invention pertains to compound pumps, comprising combined centrifugal and gear liquid pumps in a single package, and more particularly has reference to such pumps for supplying fuel to aircraft engines which are required to operate under widely varying conditions of engine speed, flight altitude and temperature.

Present day aircraft engines, particularly of the turbojet type, operate at top speeds varying from about 8,000 r.p.m. (for larger engines) to as high as 20,000 r.p.m. (for smaller engines), with minimum speeds approximately ten per cent of their maximum speeds. Fuel pumps, which are driven through reduction gears from the engine, thus generally vary in speed from about 4,000–10,000 r.p.m. to 400–1,000 r.p.m. Turbojet aircraft are also required to operate from sea level up to flight altitudes of 50,000 feet, where the standard atmosphere has a temperature of 67° F. below zero, and a density of about 15 percent of its sea level density. Under these conditions, fuel temperature may vary from about +135° to —67° F. These widely varying operating conditions impose very difficult performance requirements upon fuel pumps for such engines.

Thus, owing to the relatively low density of the atmosphere at high flight altitudes, the engine, at any given speed, requires only a small percentage of the fuel needed at low altitudes; hence, where a positive displacement (e.g. gear) type fuel pump is used, the major portion of its output must be recirculated through a by-pass passage from the outlet to the inlet of the pump, in order to avoid the excessive pressures that would obtain if the output of the pump were throttled to the proper reduced flow at high altitudes. This recirculation not only involves a substantial power loss, but what is more serious, also results in raising the temperature of the recirculated fuel by as much as 75° F. Such increase in fuel temperature, at the low atmospheric pressures obtaining at high flight altitudes, results in vaporizing (boiling) of the fuel which may result in vapor locks in the fuel system.

On the other hand, a centrifugal type fuel pump does not develop sufficient flow and pressure at low speeds (starting), and if its output is throttled sufficiently to meet the relatively small fuel flow required at high altitudes, the efficiency of the pumps decreases from about 50 percent to only about 10 percent.

Again, if a separate gear pump and centrifugal pump, with necessary valve mechanism to change the pumps from series to parallel connection, are used to supply fuel to an aircraft engine, the pumping apparatus becomes very complicated, with undesirable increase in size and weight.

A principal object of this invention is to overcome the above-mentioned disadvantages of prior art aircraft engine fuel pumps by providing a novel type of compound pump, comprising a centrifugal combined with a gear fuel pump, in a single package, of substantially smaller bulk and weight than that of two separate pumps (centrifugal and gear) of like capacity, thus achieving maximum pump space and weight efficiency.

Another object is to provide such a novel fuel pump, in which the gear element provides the total pump output at low engine (starting) speeds and also for higher engine speeds when operating at high flight altitudes.

A further object is to provide such a novel pump having means for automatically bringing the centrifugal pump element into operation when the discharge flow rate of the compound pump reaches a preselected value, said means also operating to simultaneously unload the gear pump element, so that said gear pump element operates under very low pressures during operation of the centrifugal pump element.

A still further object is to provide such a novel pump, wherein the means mentioned in the next preceding paragraph also operates automatically to cut out and drain the centrifugal pump element, whenever the discharge flow of the compound pump reaches a preselected low rate.

Still another object is to provide such a novel pump having means whereby the pilot may cut in the centrifugal pump at any time, so that he may check to see that this pump is in proper operating condition.

Still another object is to provide such a novel pump having means for removing vapor from the fuel inlet conduit of the gear pump element.

With these and other objects in view which may be incident to my improvements, my invention consists of the combination and arrangement of elements described hereinbelow and illustrated in the accompanying drawings, in which:

FIGURE 1 is a schematic view of the several elements of a compound pump according to my invention, showing their arrangement and interconnections.

FIGURE 1–A shows an alternate arrangement of the pressure control valve in FIGURE 1.

Figure 1:
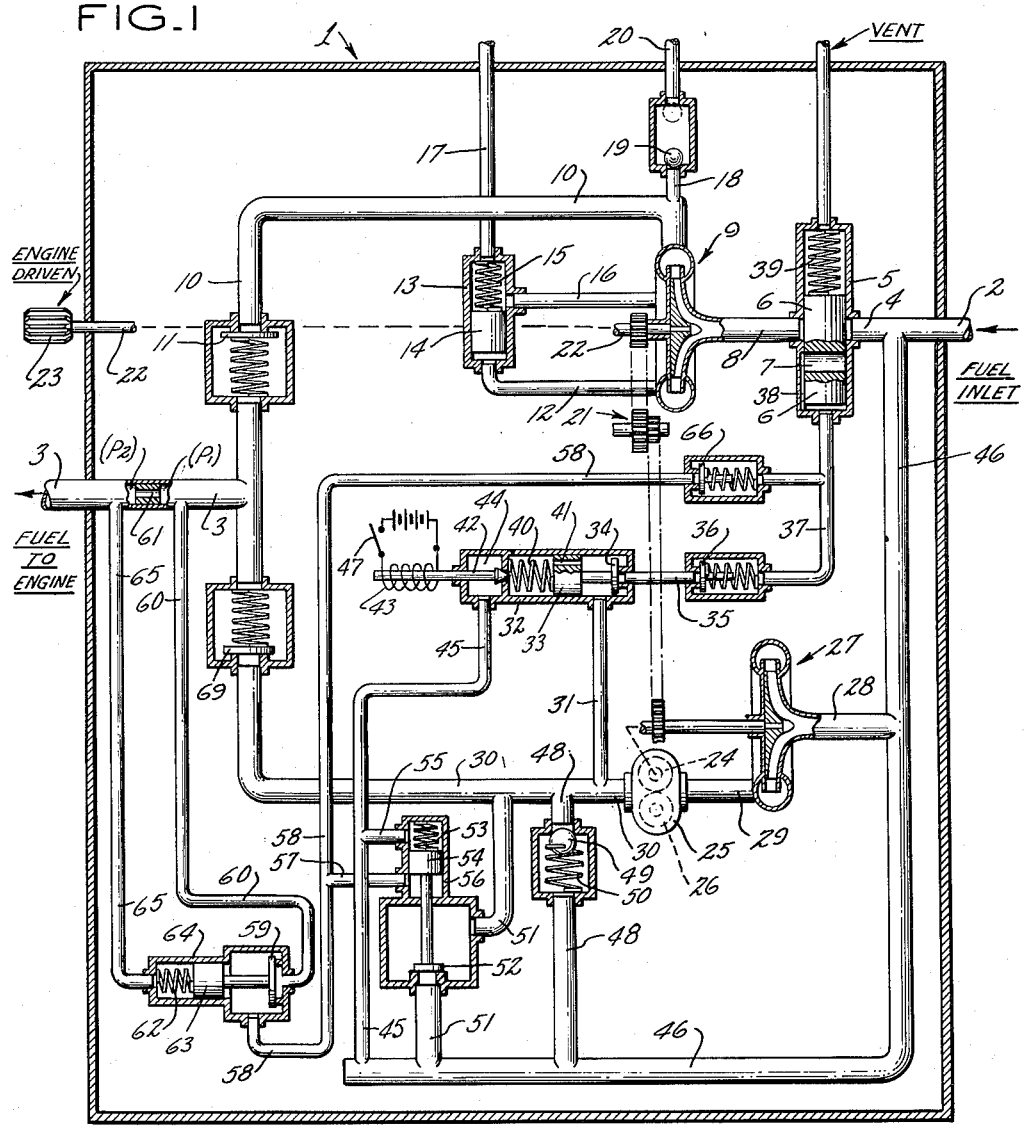
Figure 1A:
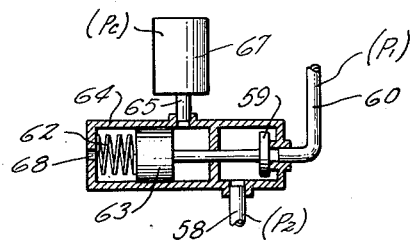

Referring first to FIGURE 1, the reference numeral 1 denotes a unitary casing, housing all the elements of my compound pump, and connected by a fuel inlet conduit 2 to a fuel supply tank (not shown), and by a fuel discharge conduit 3, to an aircraft engine (not shown). A conduit 4 connects inlet conduit 2 with the cylinder 5 of a shut-off valve 6 having a through port 7 which, when valve 6 is in its upper position, establishes communication between conduit 4 and a conduit 8 leading to the inlet of a centrifugal pump 9 whose outlet conduit 10 connects, through a check valve 11, with discharge conduit 3.

The outlet of the volute casing of pump 9 is also connected by a branch conduit 12 with the lower end of cylinder 13 of a drain valve 14 which is biased toward open position by a spring 15. The upper end of cylinder 13 is connected by a conduit 16 to a low pressure point in the volute casing of the centrifugal pump 9; and a conduit 17 leads from cylinder 13 to a point outside casing 1, whereby the fuel in said casing is drained therefrom when shut-off valve 6 closes and cuts off fuel from centrifugal pump 9. Outlet conduit 10 is further connected through a conduit 18 and float check valve 19 to a vent 20 leading to the outside of casing 1, whereby any air or vapor in pump 9 may escape therefrom when pump 9 goes into operation.

Centrifugal pump 9 is directly connected to the main drive shaft 22 of the compound pump which extends through casing 1 and is connected by a splined head 23 to the engine (not shown). Main drive shaft 22 is also connected through speed reduction gears 21 to the driving gear 24 of a gear pump 25 and also to a small, centrifugal boost pump 27, which draws fuel from inlet conduit 2, through branch conduits 28 and 46, and delivers it through a connecting conduit 29 to the inlet of gear pump 25. An outlet conduit 30 delivers fuel from gear pump 25 through a check valve 69 to discharge conduit 3.

A conduit 31 connects conduit 30 with a cylinder 32 in which is slidably mounted a piston 33, connected to a valve 34, that controls communication between cylinder 32 and a conduit 35 which connects, through a check valve 36 and conduit 37, with the lower end of cylinder 5 of shut-off valve 6. A small bleed passage 38, between cylinder 5 and valve 6, permits sufficient fuel to escape from the lower end of cylinder 5 into conduit 4 to allow valve 6 to descend to its lowest (closed) position under thrust from a spring 39.

Valve 34 is biased toward closed position by a spring 40, and the pressure of fuel which is admitted through a bleed passage 41 in piston 33, into the right end of cylinder 32. A valve 42, actuated by a solenoid 43, controls communication between the left end of cylinder 32 and a chamber 44 which is connected by conduits 45 and 46 with fuel inlet conduit 2. Valve 42 is normally closed and opens only when solenoid 43 is energized by the manual closing of a switch 47 which connects solenoid 43 with a source of electric current, e.g., a battery.

When valve 42 is closed the fuel passing through bleed passage 41 equalizes the pressure on both sides of piston 33 and spring 40 maintains valve 34 in closed position; however, when valve 42 is open, fuel escapes from the left end of cylinder 32 faster than it can enter through bleed passage 41, and since the area of piston 33 is larger than the area of valve 34, the resulting pressure differential acting on piston 33 overcomes spring 40 and opens valve 34. Thereupon fuel, under discharge pressure of pump 25, flows from conduit 30 through conduit 31 and 35, check valve 36 and conduit 37, into the lower end of cylinder 5 and raises valve 6 to open position against the resistance of spring 39, thus bringing centrifugal pump 9 into operation.

Conduit 30 is connected to conduit 46, through a branch conduit 48 and relief valve 49 which is biased to closed position by a spring 50, whose compression determines the maximum pressure in conduit 30. Another branch conduit 51 connects conduit 30 with conduit 46, through an unloading valve 52, which is biased to closed position by a spring 53 acting on a piston 54 connected to valve 52. A branch conduit 55 connects the upper end of a cylinder 56, in which piston 54 is slidably mounted, with conduit 45, so that fuel under inlet pressure from conduit 2 assists spring 53 in biasing valve 52 to closed position.

The lower end of cylinder 56 is connected, through conduits 57 and 58, with a pressure control valve 59 which controls communication between conduit 58 and a conduit 60, connected to discharge conduit 3 on the upstream side of a restriction 61 therein. Valve 59 is biased toward closed position by a spring 62 acting on a piston 63 connected to said valve. Piston 63 is slidably mounted in a cylinder 64 whose left end is connected by a conduit 65 to discharge conduit 3 on the downstream side of restriction 61. Valve 59 and piston 63 are of the same area, so that, as long as the pressure drop ($P_1-P_2$) across restriction 61, acting on valve 59 and piston 63 is less than the force of spring 62, said spring maintains valve 59 in closed position, as shown in FIGURE 1.

However, when said pressure drop ($P_1-P_2$), which is a measure of the rate of fuel flow through discharge conduit 3 to the engine (not shown), exceeds the force of spring 62, valve 59 opens and permits fuel under pressure ($P_1$) to enter the lower end of cylinder 56 (through conduits 58 and 57), and since pressure $P_1$ is greater than fuel inlet pressure in the upper part of cylinder 56, the fuel pressure differential acting on piston 54 raises said piston against the resistance of spring 53 and opens valve 52. This permits fuel to escape from conduit 30 back to conduit 28 on the inlet side of pump 27 and thus partially unloads pump 25, so that it will operate under decreasing pressure during increasing operation of centrifugal pump 9.

At the same time, the opening of pressure control valve 59, permits fuel under pressure ($P_1$) to flow through conduit 58 and a check valve 66 into the lower end of cylinder 5 where it raises valve 6 to open position against the resistance of spring 39. This insures bringing centrifugal pump 9 into operation simultaneously with the unloading of pump 25, even though solenoid valve 42 is closed.

In FIGURE 1-A, there is shown an alternate arrangement for controlling the operation of pressure control valve 59. In this arrangement, the restriction 61 in discharge conduit 3 is omitted, and in lieu thereof conduit 65 is connected to a fuel flow regulating apparatus 67 which generates a control pressure ($P_c$), as a combined function of certain selected variable factors affecting engine operation. Thus, for example, control apparatus may be of the type shown in copending application of Leighton Lee, II, Serial No. 746,975, filed May 9, 1947, now Patent No. 2,675,674. In FIGURE 1-A the left end of cylinder 64 is provided with a vent port 68 to permit free movement of piston 63.

When the alternate arrangement of FIGURE 1-A is used, the operation of my compound pump is controlled in accordance with control pressure ($P_c$) rather than by the pressure drop across restriction 61 which is a measure of the rate of fuel flow to the engine.

*Operation*

The operation of the compound pump shown schematically in FIGURE 1 is as follows:

Upon starting, the fuel requirement of the engine is small and therefore the rate of fuel flow through pump discharge conduit 3 is low, so that the pressure drop ($P_1-P_2$) across restriction is insufficient to open pressure control valve 59. When valve 59 is closed, unloading valve 52 is also closed, and since solenoid valve is normally closed, shut-off valve 6 is in its bottom (closed) position and no fuel flows to centrifugal pump 9. Under these conditions, all the fuel entering through pump inlet 2, flows to gear pump 25, and the total output of the compound pump is the delivery of gear pump 25.

When the engine speed increases to about ten percent (10%) of its maximum speed, the rate of fuel flow through discharge conduit 3 increases to a point where the pressure drop ($P_1-P_2$) across restriction 61 reaches a value sufficient to overcome the force of spring 62 and open valve 59. Upon the opening of valve 59, fuel under relatively high pressure ($P_1$) flows through conduit 58, check valve 66 and conduit 37 into the lower end of cylinder 5 and raises shut-off valve 6 to open position, thereby permitting fuel to flow to centrifugal pump 9 and bring said pump into operation. At the same time, the opening of valve 59, permits fuel under pressure ($P_1$) to flow through conduits 58 and 57 into the lower end of cylinder 56 and open valve 52, whereupon most of the fuel discharged by gear pump 25 is recirculated around said pump through by-pass conduits 51 and 46, thus partially unloading gear pump 25, so that said pump operates under decreasing pressures during increasing operation of centrifugal pump 9 and the latter therefore carries most of the total pumping load of the combined pump, after pressure control valve 59 opens.

When shut-off valve 6 opens, fuel enters centrifugal pump 9 and any air or vapor therein is forced out through float check valve 19 and vent 20. With this escape of air and vapor, fuel rises in conduit 18 and causes check valve 19 (which floats in said fuel) to close vent 20. At the same time, fuel will flow from pump 9 through conduits 12 and 16 to cylinder 13, and since the pressure in conduit 12 is higher than that in conduit 16, this fuel pressure differential, acting on valve 14, raises it to closed position in which it remains during the operation of pump 9. However, when valve 6 closes and shuts off fuel from pump 9, the pressures in conduits 12 and 16 become equalized and spring 15 lowers valve 14 to open position, which permits any fuel in pump 9 to drain out through drain conduit 17.

As an aircraft ascends to higher altitudes, the engine requires less fuel for any given engine speed, owing to the decrease in the density of the atmosphere with increase in altitude. This decrease in fuel flow to the engine at higher altitudes is controlled either manually by the pilot operating a throttling valve (not shown) in discharge conduit 3, or automatically by a fuel regulator, such as 67 of FIGURE 1-A. In either case, when the resulting decrease in the rate of fuel flow through pump discharge conduit 3 reaches a selected value (as determined by spring 62), valve 59 closes, and the same conditions of operation, as described above for low speeds (less than 10%), ensue, notwithstanding that the engine may be operating at relatively high speed.

Since it is necessary that the pilot have available some means of checking to insure that the main centrifugal pump 9 is properly operating before his aircraft leaves the ground, manually operated solenoid valve 42 is provided for that purpose. As described in column 3 this valve (42) is normally closed, during which time valve 34 is also closed, and since valve 59 is also closed at engine speeds below the selected speed (circa 10%), shut-off valve 6 is closed and pump 9 is out of operation. If now the pilot by closing switch 47, energizes solenoid 43 and opens valve 34, valve 6 is thereby opened, and pump 9 is thereupon brought into operation, even though the engine fuel requirement is below that necessary to automatically open valve 59. Hence, the pilot can check to insure that the main centrifugal pump 9 is operating properly.

From what has been disclosed hereinabove, it can be readily seen that the purpose of the main centrifugal pump 9 is to supply fuel to the engine during major (high) flow requirements; and when such flow requirements are not needed, said pump (9) is shut off, thus avoiding the necessity for by-passing or throttling the bulk of the fuel pump output, with the objectionable resulting fuel temperature rise, during periods of low fuel requirements of the engine. At the same time, the lower fuel requirements of the engine are met by the gear pump 25, which being of the positive displacement type, always maintains adequate fuel pressure and flow under low fuel requirement conditions. The provision of relief valve 49 permits the compound pump to be throttled as required for proper operation of the engine without creating excessive pressure in the compound pump.

The small centrifugal boost pump 27, which operates in series with gear pump 25, performs two functions, viz: (a) raises the inlet pressure of gear pump 25; and (b) liquifies the vapor in the fuel flowing from inlet conduit 2, before the fuel reaches gear pump 25, thereby preventing cavitation in said gear pump, and increasing its efficiency, especially, at high flight altitudes, where low atmospheric pressure increases the tendency of the fuel to vaporize.

The impeller of centrifugal pump 9 is shaped as to provide a boost element, upstream of its main pumping element, which performs the same function as centrifugal pump 27, so that the impeller of pump 9 is essentially a combined boost and high pressure pumping device.

Figure 2:
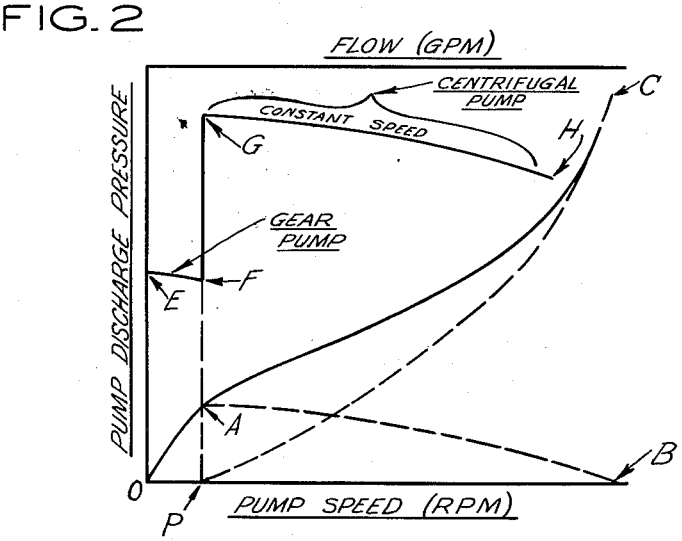
FIGURE 2 is a diagram showing pump discharge vs. speed curves of the pump illustrated in FIGURES 1 and 1–A.

FIGURE 2 shows the pump discharge pressure vs. speed (and flow) curves for the gear pump 25, the centrifugal pump 9, and the compound pump. In FIGURE 2, the ordinates denote pump discharge pressure (pounds per square inch), the (bottom scale) abscissa denote pump (engine) speed, in revolutions per minute, and the (top scale) abscissa denote pump discharge (flow), in gallons per minute. Curve O—A—B (bottom scale) shows the performance of the gear pump, where the pump discharge pressure increases in a substantially linear ratio with speed, as shown by line O—A. At a preselected point P in the range (e.g., about 10% of maximum) speed, the pressure control valve 59 opens, as described hereinabove, whereupon gear pump 25 commences to unload, with resulting decrease in the discharge pressure (and flow) of gear pump 25, throughout the remainder of the speed range P—B, as shown by the line A—B.

Curve P—C (bottom scale) shows the discharge pressure of the centrifugal pump 9 throughout the speed range P—B of said pump; and curve O—A—C shows the discharge pressure (and flow) of the compound pump, throughout its entire speed range, O—B. The ordinates of the line O—A—C are equal to the combined corresponding ordinates of the curves O—A—B and P—C. It will be noted from the curves in FIGURE 2, that during the low speed range O—P, the gear pump 25 carries all of the pumping load, while in the higher (main) speed range P—B, the centrifugal pump 9 carries the bulk of the pumping load.

The (top scale) curve E—F—G—H, shows the pump discharge pressure vs. pump discharge flow, at constant speed, of the gear pump 25, the centrifugal pump 9, and the compound pump; the portion E—F of the curve indicating the performance of the gear pump 25, and the portion G—H, indicating the performance of the centrifugal pump 9. The line F—G indicates the effect of the opening of unloading valve 52.

Figure 3:
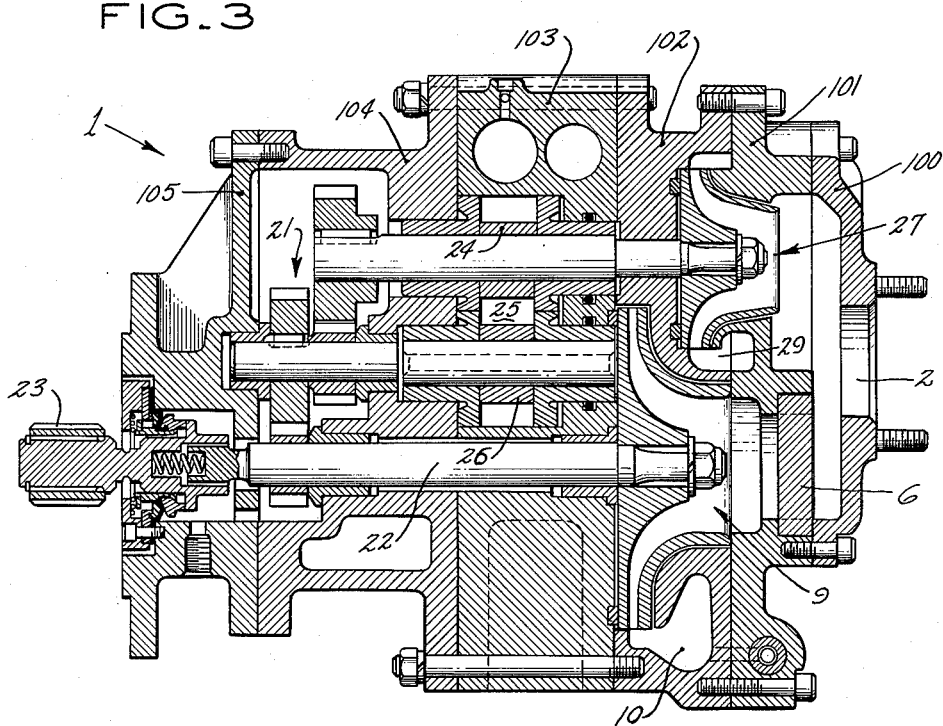
FIGURE 3 is a central, vertical section of a compound centrifugal and gear pump, as actually constructed, in accordance with my invention, as shown schematically in FIGURE 1.

Turning now to FIGURE 3 which shows the actual construction of a compound pump in accordance with my invention, as shown in FIGURES 1, 1-A and 2, it will be noted that the outside casing (denoted by reference numeral 1 in FIGURE 1) comprises six castings 100–105, which are secured together by bolts, so as to form one, single compact unit, whose overall size and weight is only about two-thirds of the size and weight of a separate gear and centrifugal pump apparatus of the same capacity. In FIGURE 3, the same reference characters denote the same parts as shown in FIGURE 1.

The peak efficiency of the gear pump 25, when operating at relatively low pressures (circa 200 p.s.i.) is approximately 52 percent, and the high speed, centrifugal pump 9 has an impeller which attains the same peak efficiency, and each pump normally operates in its most efficient range. This arrangement achieves the greatly improved performance of the compound pump, especially at high flight altitudes owing to the elimination of excess fuel heating at low fuel flows to the engine.

From the above disclosure, it will be seen that my invention provides an improved fuel pump for aircraft engines having maximum space efficiency and temperature rise control.

While I have shown and described the preferred embodiments of my invention, I desire it to be understood that I do not limit myself to the precise details of construction and arrangement of elements disclosed herein by way of illustration, as these can readily be changed and modified by those skilled in the art without departing from the spirit of my invention or exceeding the scope of the appended claims.

I claim:

1. In combination with an internal combustion engine, a rotary compound fuel pump comprising, in a single unit, a gear pump and a centrifugal pump, arranged in parallel in a single conduit supplying fuel to said engine, and driven directly by a common drive shaft in constant speed ratio with said engine; means, responsive to certain preselected, variable conditions in said engine that affect engine operation, for generating a variable control pressure, which is a preselected resultant function of said conditions; and means, responsive to said variable control pressure, for varying the discharge pressure and rate of said compound pump in accordance with a preselected relationship between the discharge pressure and speed of said compound pump throughout the operating speed range of said engine.

2. In combination with an internal combustion engine, a compound pump according to claim 1, having a second centrifugal pump arranged and driven by a common shaft with said gear pump, and effective to boost the inlet pressure of said gear pump and to liquify the vapor in the fuel flowing to said gear pump.

3. In combination with an internal combustion engine, a compound pump according to claim 1, having means for removing air and vapor from the fuel discharged by said centrifugal pump, and means for automatically draining said centrifugal pump when said pump ceases to pump fuel.

4. In combination with an internal combustion engine, a compound pump according to claim 1, having means for limiting the discharge pressure of said gear pump to a selected maximum value, regardless of the speed of said engine.

5. In combination with an internal combustion engine, a compound pump according to claim 1, having means, responsive to said control pressure, for rendering said centrifugal pump inoperative to pump fuel, until said control pressure reaches a preselected value, whereupon said centrifugal pump is brought into pumping operation.

6. In combination with an internal combustion engine, a compound pump according to claim 1, wherein said last-mentioned means includes first means whereby said gear pump carries the full pumping load and produces the entire discharge of said compound pump below a preselected point in the speed range of said engine; second means whereby, above said point, the pumping load and discharge of said compound pump are produced by both said gear and said centrifugal pumps in a preselected relationship therebetween.

7. In combination with an internal combustion engine, a compound pump according to claim 6, wherein said first and second means are actuated by a pressure control means, responsive to said control pressure, when said control pressure reaches a value corresponding to said preselected point.

8. In combination with an internal combustion engine, a compound pump according to claim 7, having manually-operated means, operatively associated with said first and second means, whereby the main pumping load of said compound pump can be shifted at the will of the operator from said gear pump to said centrifugal pump at any point in said engine range below said preselected point, so that the operativeness of said centrifugal pump may be tested.

9. In combination with an internal combustion engine, a compound pump according to claim 7, wherein said first means includes means for unloading said gear pump, when said first means is actuated by said control pressure, whereby the discharge pressure and rate of discharge of said gear pump are progressively decreased throughout the speed range of said engine above said preselected point.

10. In combination with an internal combustion engine, a pump according to claim 9, wherein said first means includes means whereby the major portion of the fuel discharge of said gear pump is by-passed around said pump to the inlet side thereof, so that said gear pump works under relatively low discharge pressures.

11. In combination with an internal combustion engine, a compound pump according to claim 10, having a second by-pass passage from the discharge side to the inlet side of gear pump and relief valve means for controlling the flow of fuel through said second by-pass passage, and effective to limit the maximum discharge pressure of said gear pump, whereby the maximum pressure in said compound pump is correspondingly limited when the output of said compound pump is throttled.

12. In combination with an internal combustion engine, a rotary compound pump for supplying fuel to said engine through a single conduit, comprising, in a single unit: a gear pump and a centrifugal pump arranged in parallel in said conduit and driven directly by a common drive shaft in constant speed ratio with said engine; and means, responsive to the differential pressure across a fixed metering orifice in said conduit downstream from said gear and centrifugal pumps, for varying the discharge pressure and rate of said compound pump in accordance with a preselected relationship between the discharge pressure and speed of said compound pump throughout the operating speed range of said engine.

13. In combination with an internal combustion engine, a compound pump according to claim 12, having a second centrifugal pump arranged and driven by a common shaft with said gear pump, and effective to boost the inlet pressure of said gear pump and to liquify the vapor in the fuel flowing to said gear pump.

14. In combination with an internal combustion engine, a compound pump according to claim 12, having means for removing air and vapor from the fuel discharged by said centrifugal pump, and means for automatically draining said centrifugal pump when said pump ceases to pump fuel.

15. In combination with an internal combustion engine, a compound pump according to claim 12, wherein said means includes first means whereby said gear pump carries the full pumping load and produces the entire discharge of said compound pump below a preselected point in the speed range of said engine; and second means whereby, above said point, the pumping load and discharge of said compound pump are produced by both said gear and said centrifugal pumps in a preselected relationship therebetween.

16. In combination with an internal combustion engine, a compound pump according to claim 15, wherein said first and second means are actuated by means, responsive to said differential pressure, when said differential pressure reaches a value corresponding to said preselected point.

17. In combination with an internal combustion engine, a compound pump according to claim 16, having manually-operated means, operatively associated with said first and second means, whereby the main pumping load of said compound pump can be shifted at the will of the operator from said gear pump to said centrifugal pump at any point in said engine range below said preselected point, so that the operativeness of said centrifugal pump may be tested.

18. In combination with an internal combustion engine, a compound pump according to claim 16, wherein said first means includes means for unloading said gear pump, when said first means is actuated by said differential pressure, whereby the discharge pressure and rate of discharge of said gear pump are progressively decreased throughout the speed range of said engine above said preselected point.

19. In combination with an internal combustion engine, a pump according to claim 18, wherein said first means includes means whereby the major portion of the fuel discharge of said gear pump is by-passed around said pump to the inlet side thereof, so that said gear pump works under relatively low discharge pressures.

20. In combination with an internal combustion engine, a compound pump according to claim 19, having a second by-pass passage from the discharge side to the inlet side of gear pump and relief valve means for controlling the flow of fuel through said second by-pass passage, and effective to limit the maximum discharge pressure of said gear pump, whereby the maximum pressure in said compound pump is correspondingly limited when the output of said compound pump is throttled.

References Cited in the file of this patent

UNITED STATES PATENTS

| | | |
|---|---|---|
| 1,740,587 | Greenfield | Dec. 24, 1929 |
| 2,124,681 | Jauch et al. | July 26, 1938 |
| 2,388,939 | Stepanoff | Nov. 13, 1945 |
| 2,520,967 | Schmitt | Sept. 5, 1950 |
| 2,636,553 | Ballantyne et al. | Apr. 28, 1953 |
| 2,651,261 | Davies | Sept. 8, 1953 |
| 2,665,637 | Lauck | Jan. 12, 1954 |
| 2,688,925 | Thoren et al. | Sept. 14, 1954 |
| 2,725,932 | Ballantyne et al. | Dec. 6, 1955 |
| 2,760,565 | Schmid | Aug. 28, 1956 |
| 2,781,727 | Marshall et al. | Feb. 19, 1957 |
| 2,877,839 | Cody | Mar. 17, 1959 |